(12) United States Patent
DoVale et al.

(10) Patent No.: US 12,545,310 B2
(45) Date of Patent: Feb. 10, 2026

(54) DRYWALL CART AND METHODS OF USING THE SAME

(71) Applicant: Gypsum Management and Supply, Inc., Tucker, GA (US)

(72) Inventors: Matthew DoVale, Roswell, GA (US); Carolina Braun Fonseca, Atlanta, GA (US); Riley Knight, Grayson, GA (US); Garrett Mathis, Alpharetta, GA (US); Connor McCarthy, Watkinsville, GA (US)

( * ) Notice: Subject to any disclaimer, the term of this patent is extended or adjusted under 35 U.S.C. 154(b) by 237 days.

(21) Appl. No.: 18/202,353

(22) Filed: May 26, 2023

(65) Prior Publication Data

US 2023/0382444 A1 Nov. 30, 2023

Related U.S. Application Data

(60) Provisional application No. 63/347,332, filed on May 31, 2022.

(51) Int. Cl.
*B62B 3/04* (2006.01)
*B62B 3/10* (2006.01)

(52) U.S. Cl.
CPC .............. *B62B 3/04* (2013.01); *B62B 3/108* (2013.01)

(58) Field of Classification Search
CPC .............. B62B 3/04; B62B 3/10; B62B 3/108
See application file for complete search history.

(56) References Cited

U.S. PATENT DOCUMENTS

| | | | | |
|---|---|---|---|---|
| 3,643,935 A * | 2/1972 | Bell | ................... | E04F 21/0023 269/84 |
| 3,841,651 A * | 10/1974 | Bigney | ................... | B62B 1/268 280/47.16 |
| 4,488,733 A * | 12/1984 | Hellsten | ................... | B62B 3/12 280/47.16 |
| 6,308,969 B1 * | 10/2001 | Young | ................... | E04F 21/18 280/63 |
| 7,219,905 B1 * | 5/2007 | Wilson | ................... | B62B 3/04 280/79.3 |
| 7,780,389 B1 * | 8/2010 | Young | ................... | B66F 19/00 414/11 |

(Continued)

FOREIGN PATENT DOCUMENTS

| | | | | |
|---|---|---|---|---|
| EP | 3978333 A1 * | 4/2022 | ............. | B62B 3/025 |
| GB | 2283210 A * | 5/1995 | ............. | B62B 3/108 |

*Primary Examiner* — John D Walters

(74) *Attorney, Agent, or Firm* — Michael Best & Friedrich LLP

(57) ABSTRACT

The disclosure generally relates to drywall carts and uses thereof. In aspects, a drywall cart is provided, which includes a cart frame, an overhanging safety bar, at least one pivot arm, and a lip guard, each configured to stabilize the drywall cart. In other aspects, a drywall cart safety kit is provided, which includes an overhanging safety bar, a first pivot arm and a second pivot arm, and a lip guard, configured to be attached to a drywall cart and to prevent the drywall cart to which it is attached from tipping or falling over. In further aspects, a method of using a drywall cart is provided, the method including the steps of raising an overhanging safety bar, loading drywall onto a base of the drywall cart, lowering the overhanging safety bar to secure the drywall, and transporting the drywall.

20 Claims, 9 Drawing Sheets

(56) References Cited

U.S. PATENT DOCUMENTS

| | | | |
|---|---|---|---|
| 8,662,486 B2* | 3/2014 | Holder | B25B 1/00 |
| | | | 269/152 |
| 9,751,550 B2* | 9/2017 | Crowley | B65G 7/08 |
| 11,383,839 B2* | 7/2022 | Burd | B64D 11/0007 |
| 11,613,288 B2* | 3/2023 | Burns | B62B 5/00 |
| | | | 211/2 |
| 2020/0086904 A1* | 3/2020 | Reynoso | B62B 3/108 |

* cited by examiner

DRYWALL CART AND METHODS OF USING THE SAME

CROSS-REFERENCE TO RELATED APPLICATION

This application claims priority to and the benefit of U.S. Application No. 63/347,332, filed May 31, 2022, the entirety of which is hereby incorporated by reference.

FILED OF THE DISCLOSURE

The disclosure generally relates to carts and more particularly relates to drywall carts and uses thereof.

BACKGROUND

Despite wide use across the industry, drywall carts bring several problems to the company. The current drywall cart design has been around for almost 50 years and is the current benchmark for drywall carts. The design is simple, comprising sheet metal and bent tube steel but is extremely durable and easy to manufacture. However, these carts are unstable, easily flip over, and are hard to maneuver, making them extremely prone to causing injuries. Injuries with the drywall cart can occur at any point during its use, either from tipping when maneuvering through corners or from pinching fingers when loading or unloading. Claims made show there is a vast array of incidents caused by the carts due to a variety of reasons. Due to the amount of weight being transported in the cart, these injuries can be life-changing, causing serious fractures when drywall flips over.

SUMMARY

The disclosure generally relates to drywall carts and uses thereof. In aspects, a drywall cart is provided, which includes a cart frame, an overhanging safety bar, at least one pivot arm, and a lip guard. The overhanging safety bar, the at least one pivot arm, and the lip guard are configured to stabilize the drywall cart. The overhanging safety bar includes a hook configured to be placed over top of drywall to secure the drywall in place during transport, and is configured to alternate between a raised position for loading drywall onto the cart, and a lowered position to secure the drywall on the cart. The at least one pivot arm is disposed perpendicular to a base of the cart from, and includes a pivot assembly to enable motion of the at least one pivot arm towards the base of the cart frame, in either direction, upon application of force thereto. The at least one pivot arm is also biased to revert to the perpendicular position absent force to retain the arm in an angled position. The lip guard is configured to prevent drywall from falling from the base of the cart frame, and to alternate between a stored position and a deployed position.

In other aspects, a drywall cart safety kit is provided, which includes an overhanging safety bar, a first pivot arm and a second pivot arm, and a lip guard. The safety kit is configured to be attached to a drywall cart, and may prevent the drywall cart to which it is attached from tipping or falling over. The first pivot arm and the second pivot arm are each disposed on opposite sides of and perpendicular to the bas of the drywall cart. Each of the first pivot arm and the second pivot arm includes a wheel assembly, a pivot assembly, and an arm portion extending between the wheel assembly and the pivot assembly. The wheel assembly, pivot assembly, and arm portion are each fixed with respect to each other. The pivot assembly includes a pivot pin and a spring attached thereto. The safety kit may also include a sheath, where the overhanging safety bar is configured to vertically slide within the sheath between a raised position and a lowered position.

In further aspects, a method of using a drywall cart is provided, the method including the steps of raising an overhanging safety bar, loading drywall onto a base of the drywall cart, lowering the overhanging safety bar to secure the drywall, and transporting the drywall. The method may also include the step of translating a lip guard from a stowed position to a deployed position to further secure the drywall after lowering the overhanging safety bar. The drywall cart may also include a plurality of pivot arms disposed perpendicular to the base of the drywall cart, where the pivot arms are configured to flex during transportation of the drywall upon contact with a passing surface, such as a wall or a doorway.

BRIEF DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

The present disclosure describes drywall carts and improvements thereof. In aspects the drywall carts disclosed herein include certain safety features designed to increase the stability of the drywall carts to prevent accidents and injuries resulting therefrom. For example, the drywall carts disclosed herein may include a safety bar, lip guard, and pivot arms. In other aspects, safety kits for retrofitting existing drywall carts are disclosed, the safety kits also having a safety bar, lip guard, and pivot arms to improve cart stability.

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed.

It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Figure 1:
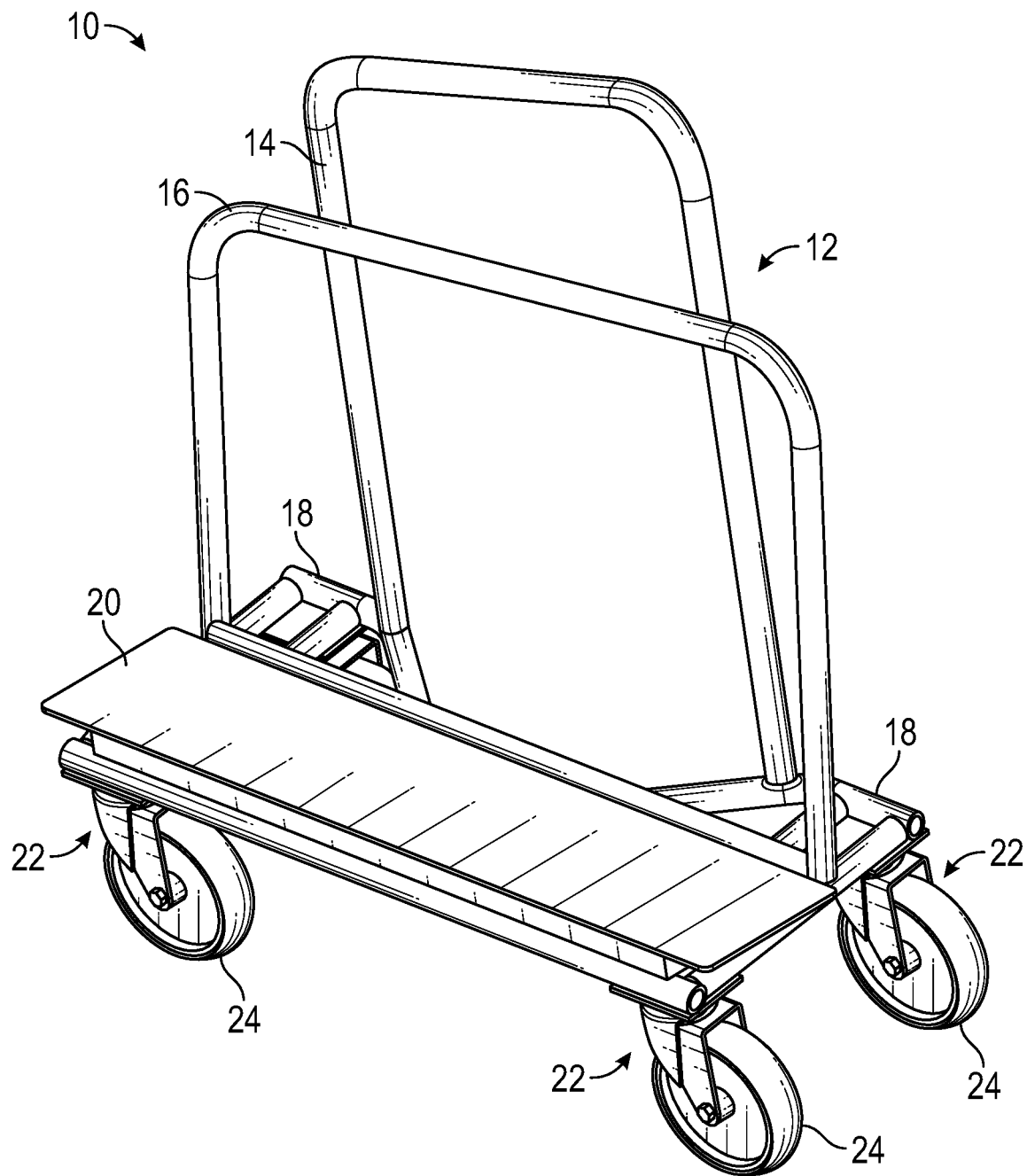
FIG. 1 depicts a drywall cart in accordance with the prior art.

Referring to FIG. 1, a conventional drywall cart 10 is shown. Conventional drywall carts 10 typically include a steel tube frame 12 and an angled base platform 20. Drywall is typically loaded onto the base platform 20 and stabilized against the frame 12. The angle of the platform 20 may also help to prevent drywall from falling over under normal operating conditions (i.e., by angling the drywall towards the frame 12).

The frame may include a first frame portion 14, a second frame portion 16, and a base frame portion 18 disposed underneath and extending from the angled base platform 20. The first frame portion 14 may be disposed adjacent to and extend upward from the base frame portion 18. The second frame portion 16 may be disposed adjacent to the first frame portion 14, and may also extend upward the base frame potion 18 disposed adjacent to the angled base portion 20. In this manner, both the first frame portion 14 and the second frame portion 16 may have a generally inverted U shape. In some instances, the first frame portion 14 and the second frame portion 16 may be substantially vertical. In other instances, the first frame portion 14 may be angled towards the base platform 20, while the second frame portion 16 is substantially vertical. This model has been effective for many years but is prone to tipping when the cart 10 is being maneuvered.

There are several other designs of drywall cart currently on the market. The other three common designs include a V-shaped model, A-shaped model, and a square model. Each of these models has drawbacks that prevent them from becoming the industry standard. The V-shaped model and square models both require the drywall to be lifted above the side guards or to be slid on or off from the front or back. This would increase the work required of the operators and decrease their efficiency. The A-shaped model allows normal loading and unloading but would require the entire cart to be turned around to offload to one side.

Referring to FIGS. 2A-2E, an improved drywall cart 100 is provided. The drywall cart 100 utilizes the design of existing cart frames, with key additions configured to stabilize and improve the safety of the cart 100. In some instances, the front tipping force of the improved drywall cart 100 disclosed herein was approximately 135, which is an approximate 275% increase as compared to existing carts 10. Similarly, the back tipping force of the improved cart 100 was approximately 242 pounds, which is about a 235% increase compared to existing carts Because tipping incidents are the primary cause of injury and accidents associated with drywall cart use, the increased tipping force directly correlates with improved safety and maneuverability of the carts.

The drywall cart 100 may be similar to cart 10 described with respect to FIG. 1, in that the drywall cart 100 includes a frame 102 having a first frame portion 104, a second frame portion 106, and a base frame portion 108. The base frame portion 108 may be at least partially disposed underneath and adjacent to an angled base platform 110. Attached to each corner 112 o the base frame portion is a wheel 114 (e.g., a castor wheel or the like).

Drywall may be loaded onto the base platform 110, the angle of which may prevent the drywall from falling over under normal operating conditions. In some instances, each of the first frame portion 104 and the second frame portion 106 extend upward from the base frame portion 108 to form an inverted U-shape. In some instances, each of the first frame portion 104 and the second frame portion 106 are substantially vertical. In other instances, as shown in FIG. 2B, the first frame portion 104 is substantially vertical, whereas the second frame portion 106 is angled towards the first frame portion 104 (and away from the angled base platform 110).

The drywall cart 100 also includes an overhanging safety bar 116 for securing drywall to the drywall cart 100, and preventing the drywall from separating and toppling over while the cart 100 is moving. In some instances, the safety bar 116 includes a U-shaped hook 118 configured to be placed over top the drywall, and a vertical portion 120 slidably disposed within a sheath 122 affixed to the frame 102 of the drywall cart 100. For example, in some instances, the sheath 122 may be attached to a horizontal bar 105a of the first frame portion 104 or a horizontal bar 107a of the second frame portion 106. In some instances, the sheath 122 may be angled such that the longitudinal axis of the sheath 122 is generally parallel to the longitudinal axis of the first and second vertical bars 105b of the first frame portion 104 or first and second vertical bars 107b of the second frame portion 106. The safety bar 116 is therefore moveable up and down in the vertical direction via the sheath 122. In some instances, the safety bar 102 is moveable up and down at an angle parallel to the longitudinal axis of the first and second vertical bars 105b of the first frame portion 104 and/or the first and second vertical bars 107b of the second frame portion 106.

Figure 2A:
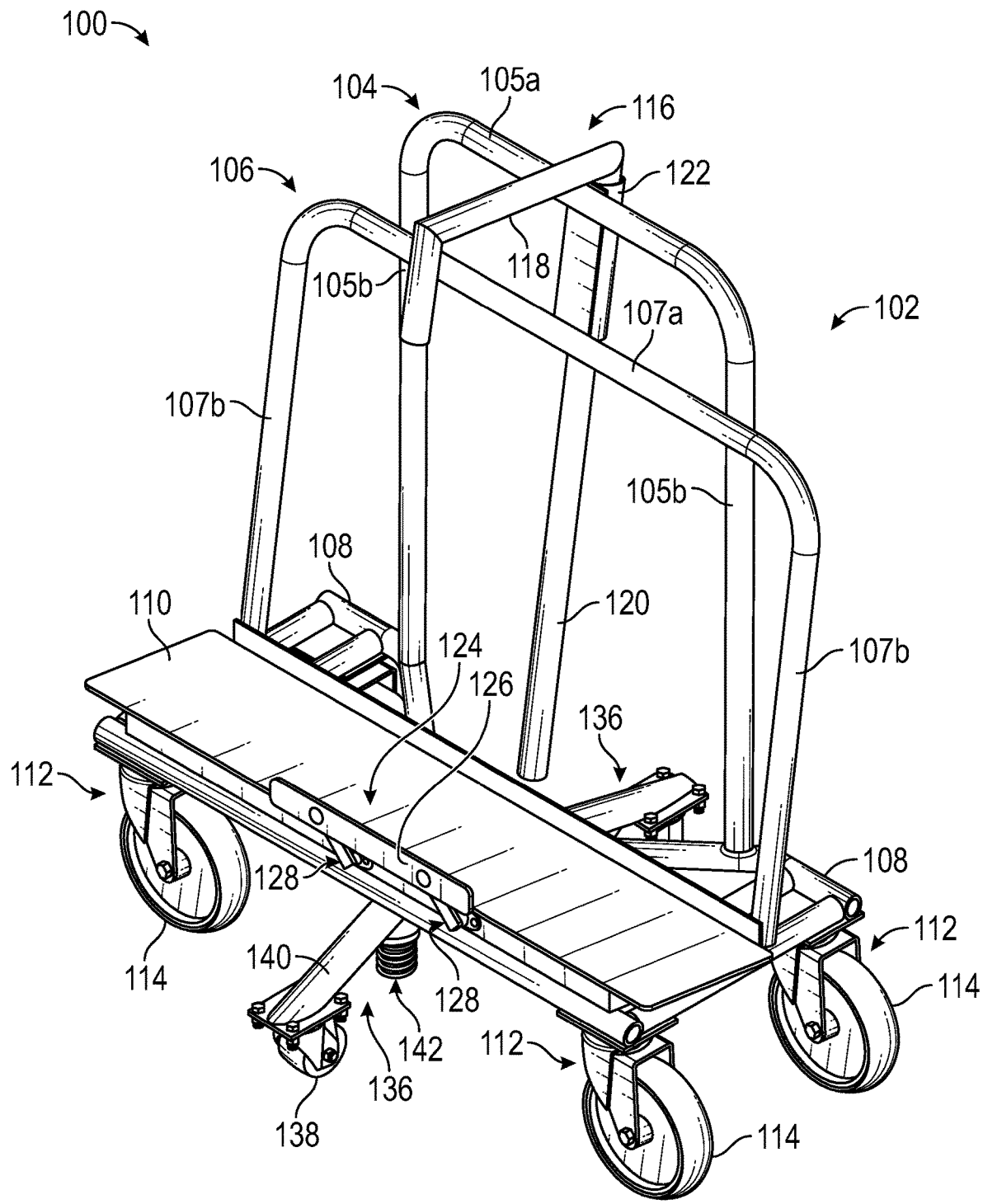
FIG. 2A is a perspective view of an improved drywall cart, in accordance with one or more embodiments of the present disclosure.
Figure 2B:
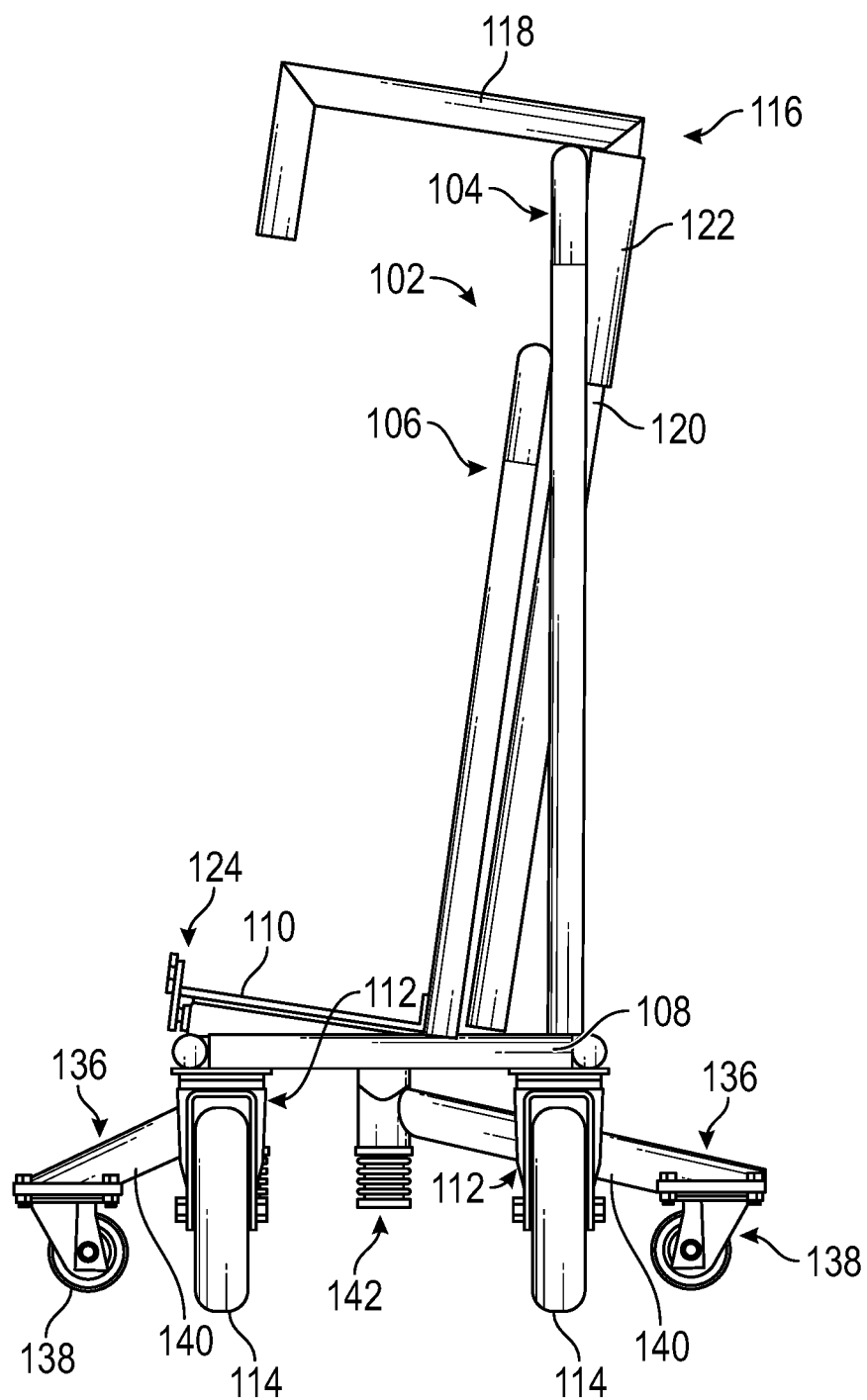
FIG. 2B is a side view of the improved drywall cart of FIG. 2A, in accordance with one or more embodiments of the present disclosure.
Figure 2C:
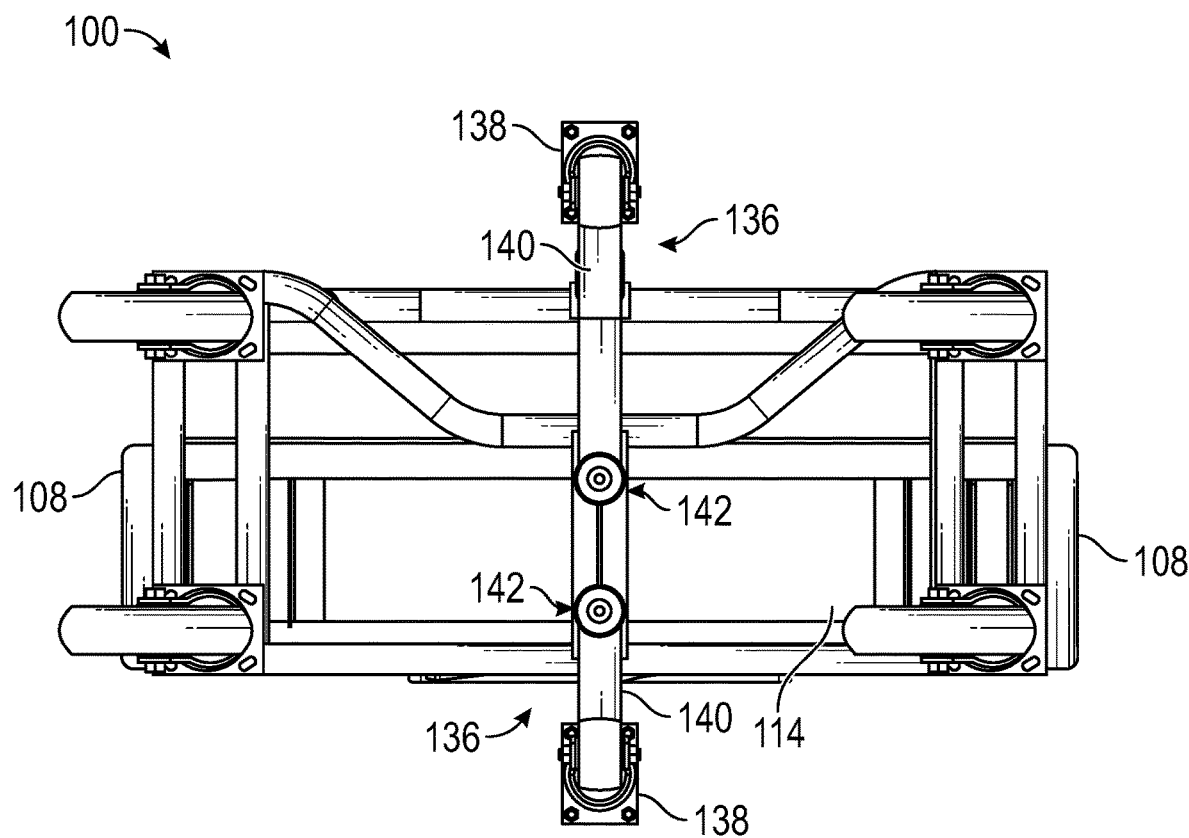
FIG. 2C is a bottom view of the improved drywall cart of FIGS. 2A-2B, in accordance with one or more embodiments of the present disclosure.
Figure 2D:
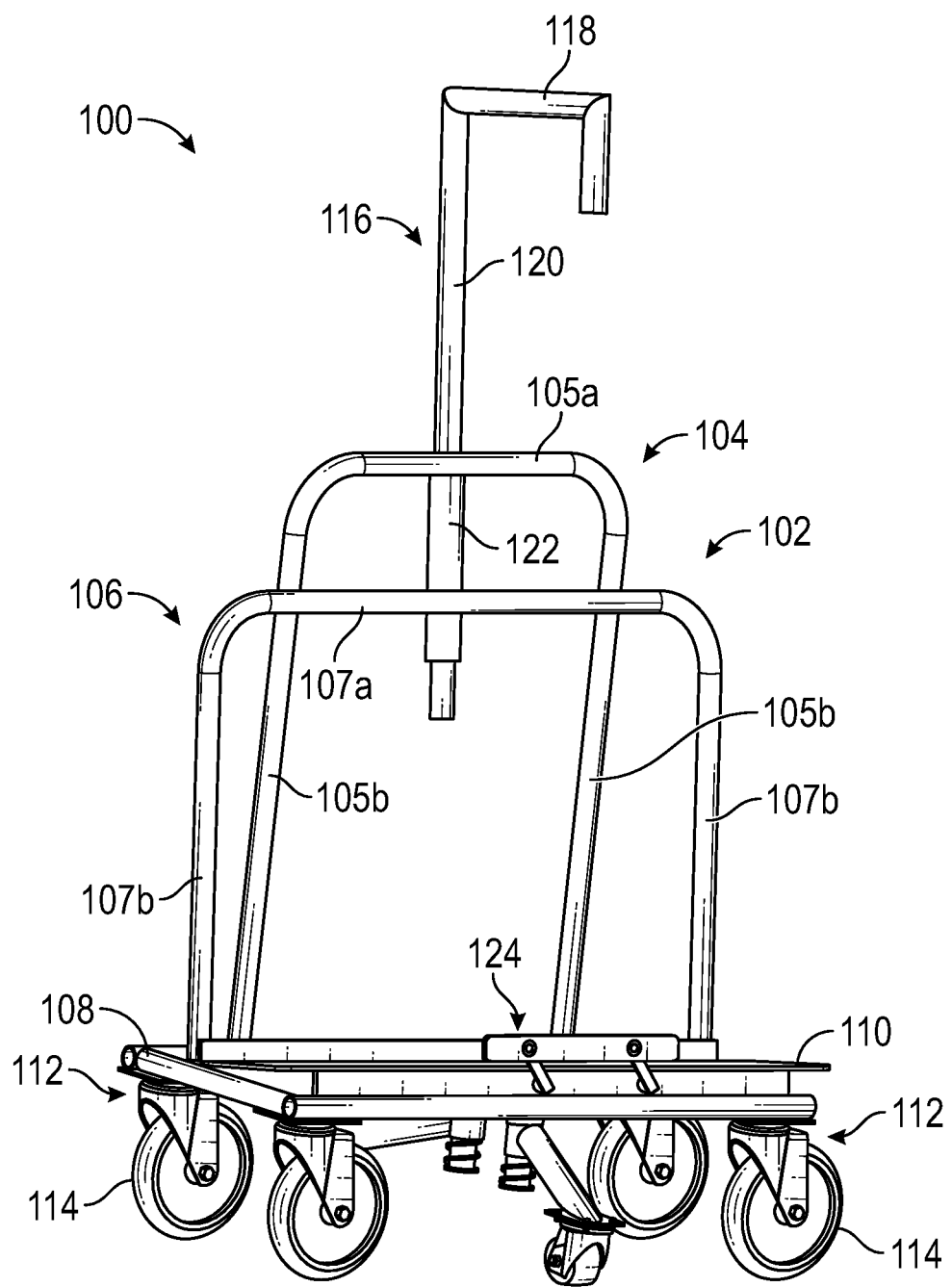
FIG. 2D is a perspective view of an improved drywall cart with a raised safety bar, in accordance with one or more embodiments of the present disclosure.

In some instances, the safety bar 116 is configured to alternate between a raised position, as in FIG. 2D, where drywall and a lowered position, as in FIGS. 2A-2B. When the safety bar 116 is in the raised position, drywall may be loaded onto the drywall cart 100. For example, when the safety bar 116 is in the raised position, one or more drywall sheets can be placed on the angled base platform 110 such that the dry wall is generally tilted towards the first and second frame portions. The lowered position of the safety bar 102 is effective to secure the drywall to the drywall cart 100. For example, once the one or more drywall sheets are placed on the angled base platform 110, the safety bar can be lowered such that the U-shaped hook 104 engages the upper edges of the one or more drywall sheets and sandwiches the one or more drywall sheets between the U-shaped hook 118 and the angled base platform 110 to secure the one or more drywall sheets to the drywall cart 100.

In some other instances, the safety bar 116 may be removed if necessary or desired when, for example, the cart 100 is being loaded onto a truck between job sites. That is, the safety bar 116 may be raised and completely removed from the sheath 122 and stored elsewhere.

In some instances, the vertical portion 120 of the safety bar 116 may include a notch configured to be received by a groove of the sheath 122 in order to prevent the safety arm 116 from freely rotating, or vice versa. In some other instances, the sheath 122 may include a rubber spacer configured to prevent excessive vertical motion of the safety arm 116. Both features may help to further prevent the risk of injury associated with using a drywall cart.

Figure 3A:
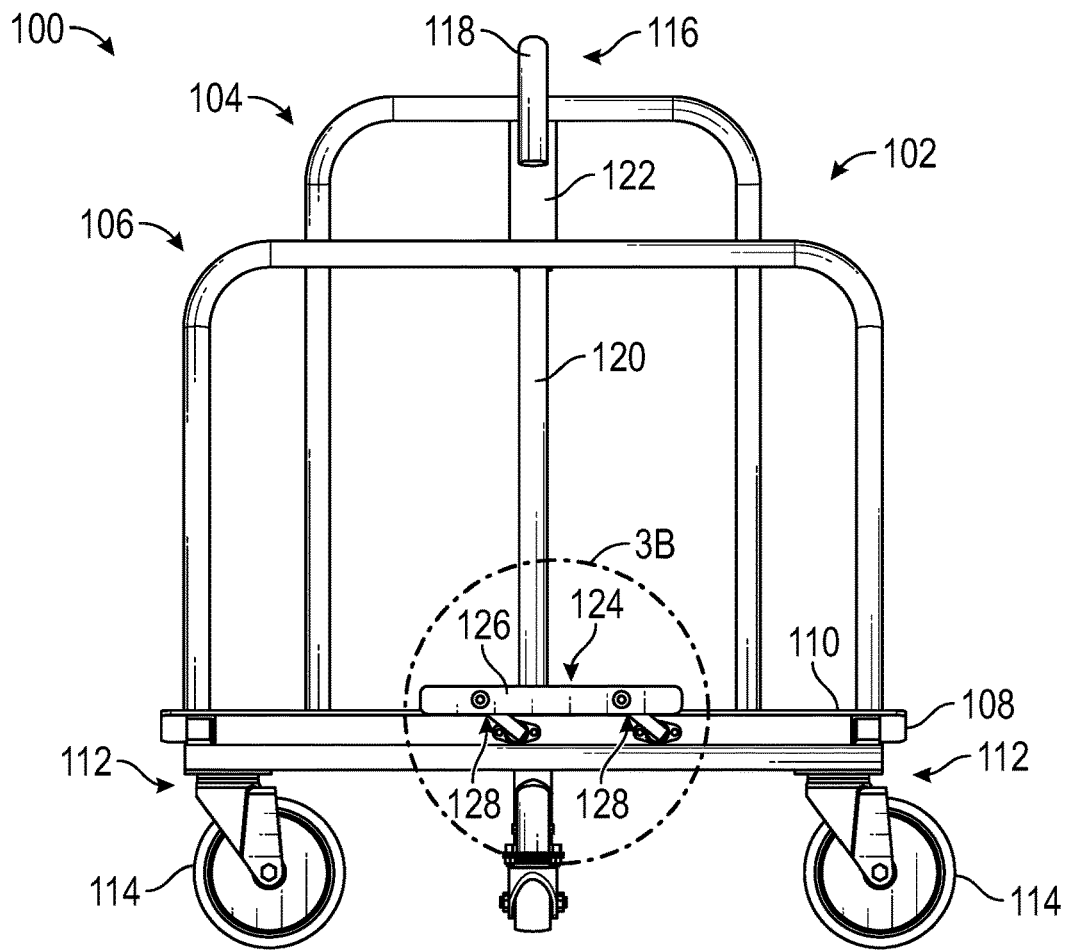
FIG. 3A is a front view of an improved drywall cart, in accordance with one or more embodiments of the present disclosure.
Figure 3B:
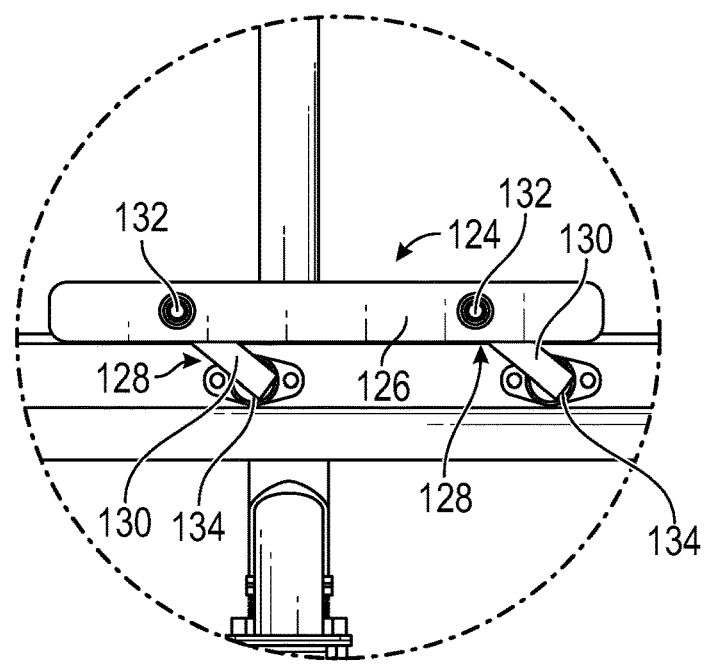
FIG. 3B is a front view of a lip guard of the improved drywall cart of FIG. 3A, in accordance with one or more embodiments of the present disclosure.

The improved drywall cart 100 also includes a lip guard 124, which acts as a barrier to prevent drywall from slipping or vibrating off the base platform 110 of the drywall cart and may be easily and quickly deployed and stored using one's foot. In some instances, as shown in FIGS. 3A-3B, the lip guard 124 includes a bumper 126 and two latch assemblies 128 each having a latch arm 130 affixed to the bumper 126 with a flange bearing 132 and affixed to the angled base platform 110 with a ball bearing 134.

In some instances, movement of the latch arms 130 about the flange bearings 132 and/or the ball bearings 134 enables movement of the bumper 126 of the lip guard 124 in a manner desired by the user. For example, the bumper 126 may be movable between a raised (i.e., deployed) position and a lowered (i.e., stowed) position. In the deployed position, the bumper 126 forms a ledge along the edge of the base 110 opposite the first frame portion 104 and second frame portion 106, and in the stowed position, the bumper 126 does not form a ledge along the base 110.

The improved drywall cart 100 further includes two pivot arms 128 affixed to the base 114 of the drywall cart 100 to improve the balance and stability thereof. In some instances, the pivot arms 128 are able to support over 1000 pounds, which significantly increases the force required to topple the cart 100 and the tip angle of no return (i.e., the angle at which the tipped cart will fall), as compared to existing carts (such as that of FIG. 1).

Figure 4A:
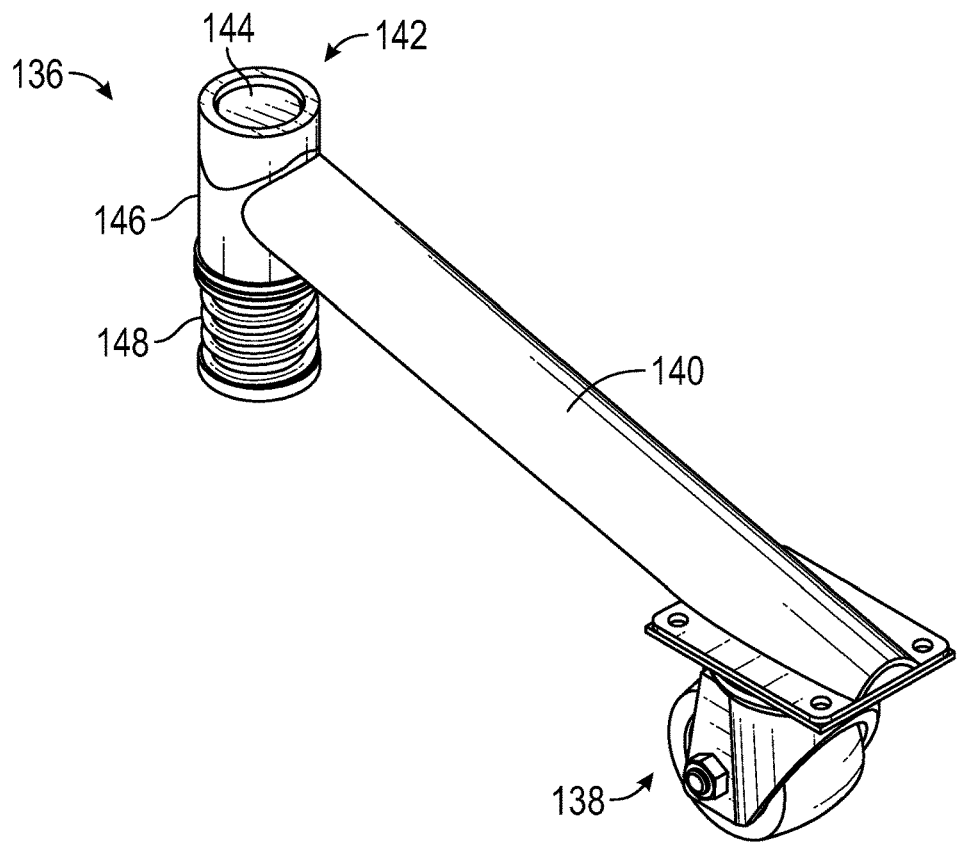
FIG. 4A is a perspective view of a pivot arm for an improved drywall cart, in accordance with one or more embodiments of the present disclosure.
Figure 4B:
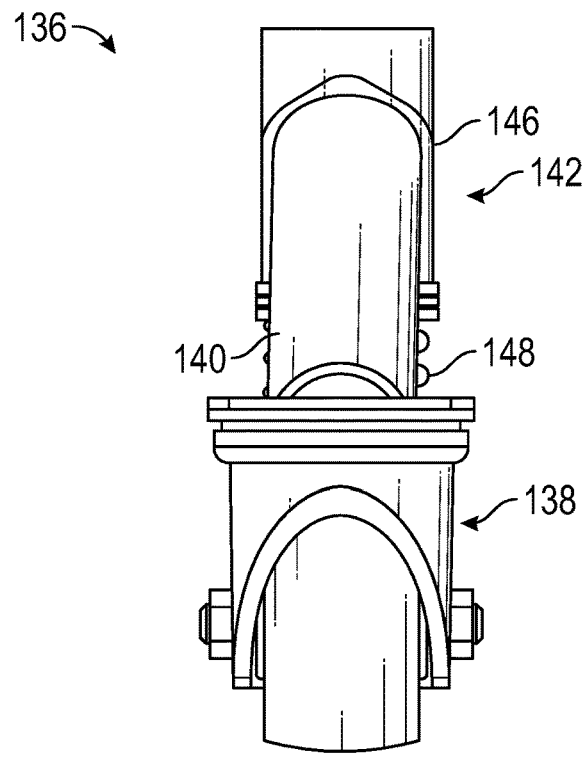
FIG. 4B is a front view of the pivot arm of FIG. 4A, in accordance with one or more embodiments of the present disclosure.

As shown in FIGS. 4A-4B, each pivot arm 136 includes an arm portion 140 fixedly disposed between a wheel assembly 138 (e.g., a castor wheel or the like) and a pivot assembly 142. The pivot arms 136 are held in a position spaced laterally apart from and perpendicular to the longitudinal length of the base platform 110 by a spring 148 of the pivot assembly 142. As shown in FIG. 2C, the each pivot assembly 142 is attached to the base frame portion 108, thereby securing each respective pivot arm 136 to the frame 102.

Figure 2E:
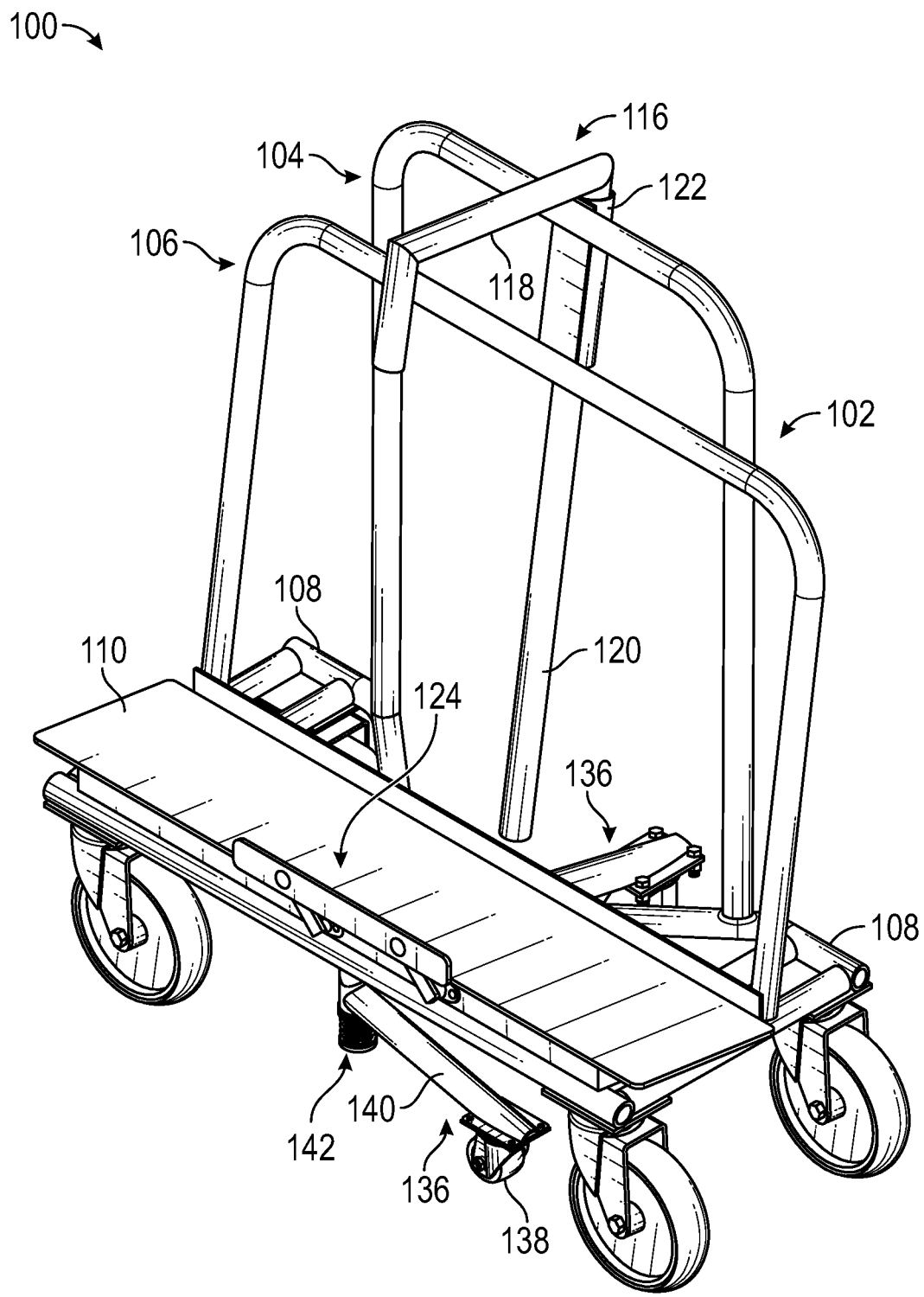
FIG. 2E is a perspective view of an improved drywall cart with an angled pivot arm, in accordance with one or more embodiments of the present disclosure.

In some instances, the spring 148 of the pivot assembly 142 is sized so that it is strong enough to keep the pivot arm 136 in a first position, as in FIGS. 2A-2D, where the arm portion 140 is generally perpendicular to the longitudinal length of the base platform 110 (e.g., the desired position while transporting a loaded drywall cart 100), but small enough to allow the arm 136 to pivot to a second position, as in FIG. 2E, in which the arm portion 140 is generally parallel to the longitudinal length of the base platform 110 (e.g., out of the way when making a turn through a doorway). In this manner, the pivot arms 136 are spring loaded between the first position and the second position. That is, the spring 148 maintains the arm portion 140 in the first position unless the spring force is overcome.

For example, as the drywall cart 100 is moved, the spring 148 enables movement of the pivot arms 136 as necessary via a the wheel assembly 138. In some instances, the pivot arms 136 may translate up to 90° in either direction about the spring axis S to the second position that is parallel with the base 110 of the cart 100. However, when the force being applied to the spring 148 is released, the pivot arms 136 will revert to the resting first position perpendicular to the base 110 of the drywall cart 100.

In some instances, the pivot arms 136 effectively double the wheel base of the drywall cart 100 without increasing the profile thereof (i.e., the pivot arms 136 do not protrude beyond the base 110). In other instances, the pivot arms 136 do protrude beyond the base 110 of the cart 110. In such instances, the pivot arms 136 may be configured to locked in a stowed position underneath the base 110 of the cart 100 to prevent tripping accidents during loading and unloading.

Figure 5A:
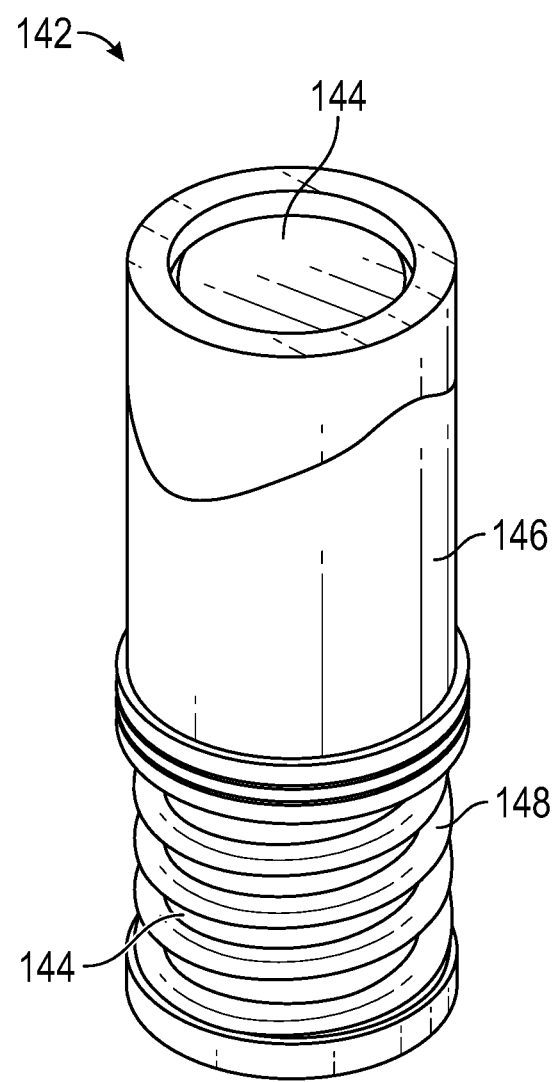
FIG. 5A is a perspective view of a pivot assembly for the pivot arm of FIGS. 4A-4B, in accordance with one or more embodiment of the present disclosure.
Figure 5B:
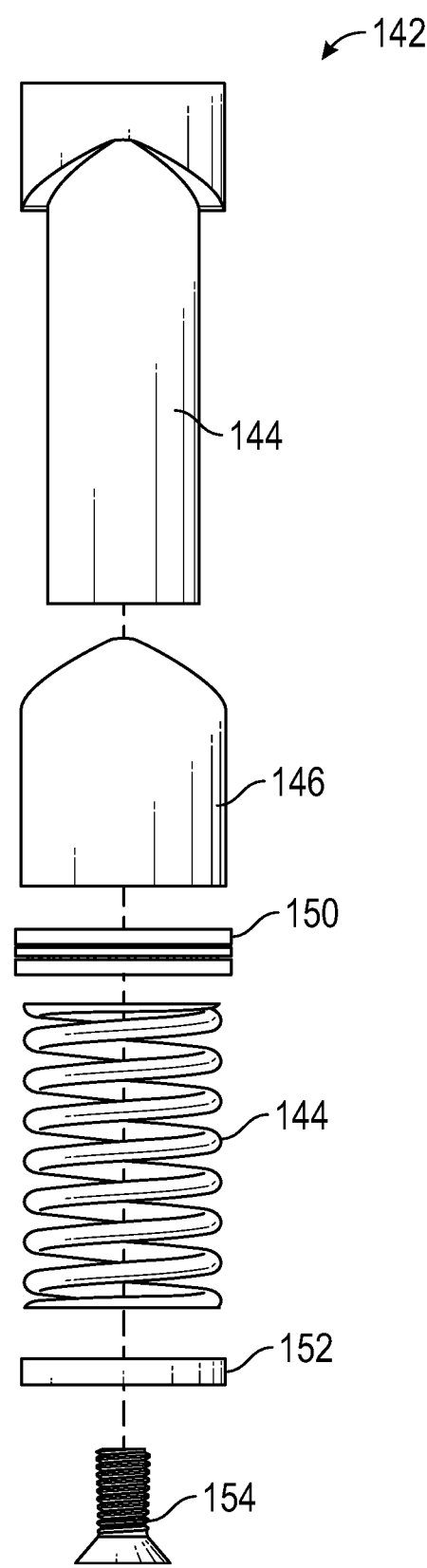
FIG. 5B is an exploded view of the pivot assembly of FIG. 5A, in accordance with one or more embodiments of the present disclosure.

Referring now to FIGS. 5A-5B, the pivot assembly 142 of the pivot arm 136 includes a spring 148 attached to a pivot pin 144 and a pivot sleeve 146 via a thrust ball bearing 150. Upon application of force to the spring 148, the spring 148 will cause the pivot sleeve 146 to rotate about the pivot pin 144 fixedly attached to the base 110 of the drywall cart 100. The pivot assembly 142 is secured together with a bottom plate 152 and a screw 154. For example, the bottom plate 152 and screw 154 may be secured to the bottom of the pivot pin 144, in a manner than retains the spring 148, thrust ball bearing 150, and pivot sleeve 146 therebetween.

In some instances, the safety bar 116, lip guard 124, and pivot arms 136 are provided as a kit, which can be retrofitted to existing drywall carts such as those described with respect to prior art FIG. 1.

In some instances, the drywall cart 100 (or kit) is provided in a material that has the same texture and surface feeling of existing drywall carts (e.g., steel) to allow for proper handling and maximize durability.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents.

The foregoing description has been presented for the purposes of illustration and description. It is not intended to be exhaustive or to limit the present disclosure to the precise form disclosed. Many modifications and variations are possible in light of the above teaching. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A drywall cart configured to transport one or more drywall sheets, the drywall cart comprising:
    a cart frame;
    an overhanging safety bar movably attached to the cart frame; and
    a sheath, wherein the overhanging safety bar is configured to vertically slide within the sheath between a raised position and a lowered position;
    wherein the overhanging safety bar is configured to be placed about the one or more drywall sheets to secure the one or more drywall sheets to the drywall cart during transport.

2. The drywall cart of claim 1, further comprising:
    at least one pivot arm configured to stabilize the drywall cart; and
    a lip guard configured to secure the one or more drywall sheets to the drywall cart during transport.

3. The drywall cart of claim 1, wherein drywall sheets may be loaded onto the drywall cart when the overhanging safety bar is in the raised position, and wherein the drywall sheets are secure on the drywall cart when the overhanging safety bar is in the lowered position.

4. The drywall cart of claim 1, further comprising at least one pivot arm configured to stabilize the drywall cart, wherein the at least one pivot arm is disposed in a perpendicular position relative to a base of the cart frame.

5. The drywall cart of claim 4, wherein the at least one pivot arm comprises a pivot assembly to enable motion of the at least one pivot arm towards the base of the cart frame, in either direction, upon application of force thereto.

6. The drywall cart of claim 5, wherein the at least one pivot arm is biased to revert to the perpendicular position absent a reaction force to retain the at least one pivot arm in an angled position.

7. The drywall cart of claim 1, further comprising a lip guard configured to secure the one or more drywall sheets to the drywall cart during transport, wherein the lip guard is configured to prevent the drywall sheets from falling from a base of the cart frame.

8. The drywall cart of claim 1, further comprising a lip guard configured to secure the one or more drywall sheets to the drywall cart during transport, wherein the lip guard is configured to alternate between a stored position and a deployed position via at least one latch arm.

9. The drywall cart of claim 1, further comprising a plurality of wheels, each wheel of the plurality of wheels coupled to the cart frame.

10. The drywall cart of claim 9, further comprising a pair of pivot arms configured to stabilize the drywall cart, each pivot arm of the pair of pivot arms having a wheel assembly separate from the plurality of wheels and coupled to the cart frame via an arm portion.

11. A cart configured to transport one or more drywall sheets, the cart comprising:
    an overhanging safety bar;
    a sheath, wherein the overhanging safety bar is configured to vertically slide within the sheath between a raised position and a lowered position;
    a first pivot arm and a second pivot arm; and
    a lip guard;
    wherein each of the overhanging safety bar, the first pivot arm and the second pivot arm, and the lip guard are configured to prevent the cart and/or the one or more drywall sheets from tipping or falling over.

12. The cart of claim 11, wherein the first pivot arm and the second pivot arm are disposed on opposite sides of a base of the cart.

13. The cart of claim 12, wherein each of the first pivot arm and the second pivot arm are disposed perpendicular to the base of the cart.

14. The cart of claim 11, wherein each of the first pivot arm and the second pivot arm comprises:
    a wheel assembly;
    a pivot assembly; and
    an arm portion extending between the wheel assembly and the pivot assembly;
    wherein the arm assembly couples the wheel assembly to the pivot assembly to facilitate movement of the wheel assembly relative to a base of the cart.

15. The cart of claim 14, wherein the pivot assembly comprises a pivot pin and a spring attached thereto.

16. A method of using a drywall cart, the method comprising:
    raising an overhanging safety bar;
    loading drywall onto a base of the drywall cart;
    lowering the overhanging safety bar to secure the drywall;
    moving a lip guard from a stowed position into a deployed position to further secure the drywall; and
    transporting the drywall.

17. The method of claim 16, wherein the drywall cart comprises a plurality of pivot arms disposed perpendicular to the base of the drywall cart.

18. The method of claim 17, wherein the plurality of pivot arms are configured to flex during transportation of the drywall cart upon contact with a passing surface.

19. A drywall cart configured to transport one or more drywall sheets, the drywall cart comprising:
    a cart frame;
    an overhanging safety bar movably attached to the cart frame to secure the one or more drywall sheets to the drywall cart during transport; and at least one pivot arm configured to stabilize the drywall cart, wherein the at least one pivot arm is disposed in a perpendicular position relative to a base of the cart frame, wherein the at least one pivot arm comprises a pivot assembly to enable motion of the at least one pivot arm towards the base of the cart frame, in either direction, upon application of force thereto, and wherein the at least one pivot arm is biased to revert to the perpendicular position absent a reaction force to retain the at least one pivot arm in an angled position.

20. A drywall cart configured to transport one or more drywall sheets, the drywall cart comprising:

a cart frame;

an overhanging safety bar movably attached to the cart frame to secure the one or more drywall sheets to the drywall cart during transport; and a lip guard configured to secure the one or more drywall sheets to the drywall cart during transport, wherein the lip guard is configured to alternate between a stored position and a deployed position.

\* \* \* \* \*